July 23, 1957

V. WEBER ET AL 2,800,283

CONTROL AND INDICATING SYSTEM FOR FLUID FUEL BURNERS

Filed Sept. 3, 1952

INVENTORS.
VICTOR WEBER,
RUSSELL F. GARNER.
BY
Albert J. Henderson
their ATTORNEY.

United States Patent Office 2,800,283
Patented July 23, 1957

2,800,283

CONTROL AND INDICATING SYSTEM FOR FLUID FUEL BURNERS

Victor Weber, Greensburg, and Russell F. Garner, Youngwood, Pa., assignors to Robertshaw-Fulton Controls Company, Greensburg, Pa., a corporation of Delaware Application September 3, 1952, Serial No. 307,608

3 Claims. (Cl. 236—94)

This invention relates generally to control apparatus for fluid fuel burners wherein an indicating device is utilized to manifest conditions of a controlling device. More specifically, the invention relates to apparatus for indicating the relative position of one or more valves controlling fuel flow to fluid fuel burners.

It is a principal object of this invention to indicate when a desired temperature condition is achieved.

Another object of this invention is to indicate when a control device is conditioned to control a temperature condition.

Another object of this invention is to indicate the position of a valve member inside a valve casing by means visible exteriorly of the casing.

Another object of this invention is to control an electrical indicating device by a pair of switches respectively connected to a manually operable valve and a thermally responsive valve arranged to control fuel flow to a burner.

Other objects and advantages will appear from the following specification taken in connection with the accompanying drawings wherein.

Figure 1:
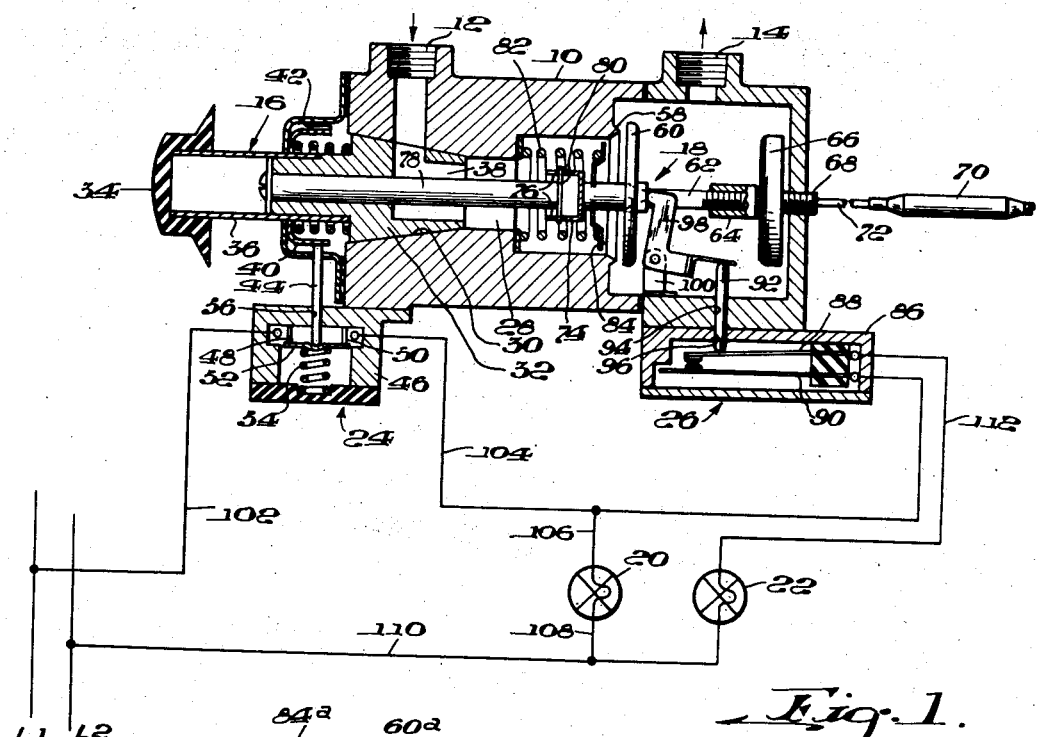
Fig. 1 is a schematic showing of a control system embodying this invention.

Referring more particularly to the drawing, the control and indicating system is shown as comprising a valve casing 10 having an inlet 12 adapted for connection to a source of fluid fuel, and an outlet 14 adapted for connection to a fluid fuel burner (not shown). A manually operable valve 16 and a thermally responsive valve 18 are disposed in the casing 10 and control fluid flow between the inlet 12 and the outlet 14. Electrical indicating means, here shown as a pair of incandescent lamps 20, 22, are connected to a source of electric energy, line wires L1, L2, and energization thereof is controlled by a pair of switches 24, 26. The switch 24 is arranged to be operated by the manually operable valve 16 and the switch 26 is arranged to be operated by the thermally responsive valve 18.

As shown in Fig. 1, the casing 10 is provided with an axially extending passage 28 which communicates with the inlet 12 and the outlet 14. At one end of the passage 28, the walls thereof form a tapered valve seat 30 which cooperates with a tapered plug valve member 32 to close the end of the passage 28. The plug valve member 32 is adapted to be rotated relative to the seat 30 by a manually operable handle 34 carried by a stem 36 which is secured to the plug valve member 32 by any suitable means. The plug valve member 32 is provided with an angular passage 38 one end of which is adapted to register with the passage 28 in the casing 10 in all positions of the plug valve member 32. The other end of the passage 38 registers with the inlet 12 in one position of the plug valve member 32 and is out of registry with the inlet 12 in another position thereof. It will thus be apparent that rotation of the handle 34 will move the manually operable valve 16 between fuel flow preventing and fuel flow permitting positions.

Mounted on the stem 36 of the manually operable valve 16 is a flanged collar 40. The collar 40 is adapted to rotate with the stem 36 and is provided with a raised boss 42 on the outer periphery thereof. The outer periphery of the collar 40 and the boss 42 provide a cam surface which engages one end of an operating stem 44 of the switch 24.

The switch 24 comprises a housing 46 secured to the casing 10 and having a pair of spaced contacts 48, 50 secured to the inner wall thereof. A bridging member 52 spans the contacts 48, 50 and is biased toward the same by a spring 54 which is seated on the housing 46. The operating stem 44 is slidably mounted in a bore 56 formed in the bottom of the housing 46 and extends into the interior of the housing 46 to abut the contact bridging member 52.

The length of the operating stem 44 is such that when the outer end thereof is in engagement with the outer periphery of the collar 40, the bridging member 52 is in engagement with the contacts 48, 50. However, when the stem 36 of the manually operable valve 16 is rotated to bring the boss 42 into engagement with the end of the operating stem 44, the stem is moved downward as viewed in Fig. 1 to move the bridging member 52 against the bias of the spring 54 and out of engagement with the contacts 48, 50. In the preferred embodiment of the invention, the boss 42 is so positioned on the collar 40 that it will engage the operating stem 44 only when the plug valve member 32 is positioned to place the passage 38 out of registry with the inlet 12. Thus, the switch 24 will be maintained in the open position when the manually operable valve 16 is in fuel flow preventing position.

The thermally responsive valve 18 is positioned within the casing 10 at the outlet end of the passage 28 and comprises an annular valve seat 58 with a valve disc 60 movable toward and away from the seat 58. The valve disc 60 is secured at a medial point to a valve stem 62, one end of which is threaded into a tapped fitting 64 carried by the movable end wall of an expansible and collapsible thermal power unit 66. The power unit 66 is securely mounted on a wall of the casing 10 by means of a hollow stud 68 carried thereby and threaded through the wall of the casing 10.

A bulb 70 adapted to be located to respond to the temperature being controlled, is connected to the power unit 66 by a capillary tube 72. This thermal control assembly comprising the bulb 70, capillary tube 72 and power unit 66 is filled with a liquid which, upon changes in temperature sensed by the bulb 70, will serve to expand and contract the power unit 66 as is well known to those skilled in the art.

The other end of the valve stem 62 carries a cup-shaped element 74 which is provided with a pair of diametrically opposed axially extending slots 76. Disposed in the passage 28 is a shaft 78 having one end secured to the plug valve member 32 and carrying on the other end thereof a transversely extending pin 80. The ends of the pin 80 are slidably received in the slots 76 of the cup-shaped element 74 to provide a slidable, torque transmitting connection between the shaft 78 and the valve stem 62.

The hereinbefore described connection between the manually operable valve 16 and the thermally responsive valve 18 is conventional. With such an arrangement, rotation of the handle 34 not only actuates the manually operable valve 16 but also transmits torque to the valve stem 62 to screw the same in or out of the tapped fitting 64 thereby adjusting the position of the valve disc 60 relative to the power element 66 and setting the temperature at which the valve disc 60 will be moved into engagement with the valve seat 58.

The valve disc 60 is biased away from the valve seat 58 by means of a spring 82 acting between the casing 10 and a collar 84 connected to the valve stem 62 between the cup-shaped element 74 and the valve disc 60.

As shown in Fig. 1, the switch 26 may comprise a housing 86 mounted on the casing 10 and containing a pair of flexible contact arms 88, 90 having an inherent bias which normally holds them out of engagement with each other. An operating stem 92 is slidably mounted in aligned bores 94, 96 formed in the casing 10 and the housing 86 respectively. One end of the operating stem 92 extends into the interior of the housing 86 and into engagement with the contact arm 88. The other end of the operating stem 92 extends into the interior of the casing 10 and into engagement with one end of a bell-crank lever 98 which is pivotally mounted on a bracket 100 carried by the casing 10. The other end of the bell-crank lever 98 engages the valve disc 60 and is maintained in abutting relation therewith by the inherent bias of the contact arm 88 acting through the operating stem 92.

In operation, movement of the valve disc 60 toward and away from the valve seat 58 will cause the bell-crank lever 98 to rock about its pivot and impart a reciprocating motion to the operating stem 92 to thereby move the contact arm 88 into and out of engagement with the contact arm 90. The length of the operating stem 92 is such that the contact arm will be maintained out of engagement with the contact arm 90 when the valve disc 60 is in engagement with the valve seat 58. Thus, the switch 26 will be opened when the thermally responsive valve 18 is positioned to prevent fuel flow to the outlet 14 and will be closed when the thermally responsive valve 18 is positioned to permit such flow.

The indicating lamps 20, 22 are connected in parallel circuit and this circuit is connected across line wires L1, L2 through the switch 24. The switch 26 is connected in series with the lamp 22. The details of the connecting circuits will be brought out more fully in the description of the operation of the apparatus which follows.

Assume that the manually operable valve 16 is in fuel flow preventing position. In such position of the valve 16, the boss 42 on the collar 40 will be in engagement with the operating stem 44 of the switch 24 to hold the same in its depressed position and thereby maintain the bridging member 52 out of engagement with the contacts 48, 50 and maintain an open circuit between the indicating lamps 20, 22 and line wires L1, L2.

To place the device in operative condition, the handle 34 is manipulated to rotate the plug valve member 32 to fuel flow permitting position and to set the thermally responsive valve 18 to respond to a predetermined temperature. Such manipulation of the handle 34 will rotate the collar 40 to move the boss 42 out of engagement with the stem 44 permitting the same to move to its uppermost position and releasing the bridging member 52 of the switch 24 for movement under the bias of the spring 54 into engagement with the contacts 48, 50. Such closing of the switch 24 completes a circuit through the lamp 20 which may be traced as follows: from line L1 through wire 102, contact 48, bridging member 52, contact 50, wire 104, wire 106, lamp 20, wire 108, and wire 110 to line wire L2. Lamp 22 which is connected in parallel with lamp 20 is also energized through a circuit which may be traced as follows: line wire L1, wire 102, contact 48, bridging member 52, contact 50, wire 104, through contact arm 90 of switch 26, contact arm 88, wire 112, and lamp 22 to wire 110 and line wire L2. Lamps 20, 22 are thus both energized and illumination thereof indicates that both the manually operable valve 16 and the thermally responsive valve 18 are open.

As the temperature being controlled approaches the predetermined limit, the valve disc 60 is moved toward the valve seat 58 thereby permitting the contact arm 88 to move under its bias out of engagement with the contact arm 90. The contact arms 88, 90 preferably separate as the disc 60 is about to contact the valve seat 58 thereby breaking the energizing circuit for the lamp 22. The lamp 22 thus ceases to produce a light and this provides an indication that the desired temperature condition has been achieved. It is to be noted however that the lamp 20 remains energized to indicate that the apparatus is in operation.

Figure 2:
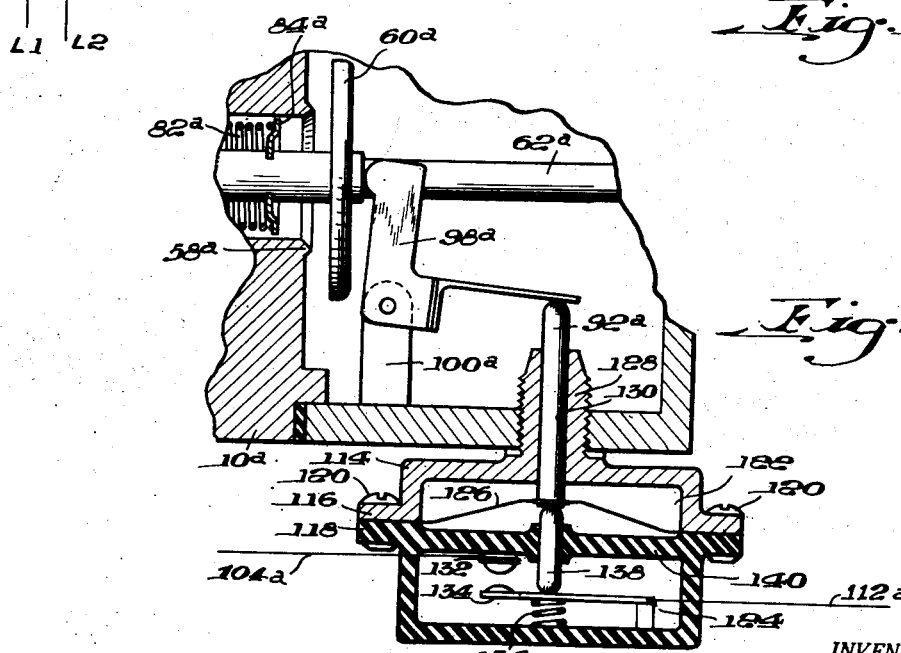
Fig. 2 is a sectional view of a modified form of a portion of the apparatus shown in Fig. 1.

The modified construction illustrated by Fig. 2, in which parts corresponding to parts heretofore described are designated by corresponding reference numerals having the suffix "a," is a departure from that shown in Fig. 1 in that the switch controlling energization of the lamp 22 is of a different form and is adapted to be closed as the thermally responsive valve 18 moves to fuel flow preventing position. More particularly, the switch of Fig. 2 comprises a housing 114 defined by a pair of flanged, cup-shaped members 116, 118 clamped together by a plurality of screws 120 to form an enclosed space. The enclosed space within the housing 114 is divided into a pair of chambers 122, 124 by a flexible sealing device or diaphragm 126 which is clamped at its outer edge between the cup-shaped members 116, 118.

An elongated shank 128 formed on the cup-shaped member 116 is threaded through the wall of the casing 10a and a bore 130 extending therethrough provides communication between the interior of the casing 10 and the chamber 122. The operating stem 92a is slidably mounted in the bore 130 and is secured at one end to the center of the diaphragm 126. It will be apparent that the sliding fit of the operating stem 92a in the bore 130 will be a possible source of leakage from the casing 10. However, the diaphragm 126 will form an effective seal and prevent escape of fluid from the casing to the atmosphere.

The chamber 124 contains the switching device which may comprise a relatively fixed contact 132 adapted for connection to wire 104 and a relatively movable contact 134 adapted for connection to wire 112. The movable contact 134 is biased toward the fixed contact 132 by a spring 136 which is seated on the member 118. The spring 136 also serves to bias the contact 134 into engagement with a thrust element 138 which is slidably mounted in a suitable spider 140 and engages the diaphragm 126 at a point opposite the connection of the operating stem 92a.

Operation of the embodiment shown in Fig. 2 is similar to the operation of the apparatus shown in Fig. 1, but differs in that movement of the thermally responsive valve disc 60a into engagement with the valve seat 58a serves to close the contacts 132, 134 and complete the energizing circuit for the lamp 22. The lamp 22 will thus be illuminated when the desired temperature condition has been achieved.

Figure 3:
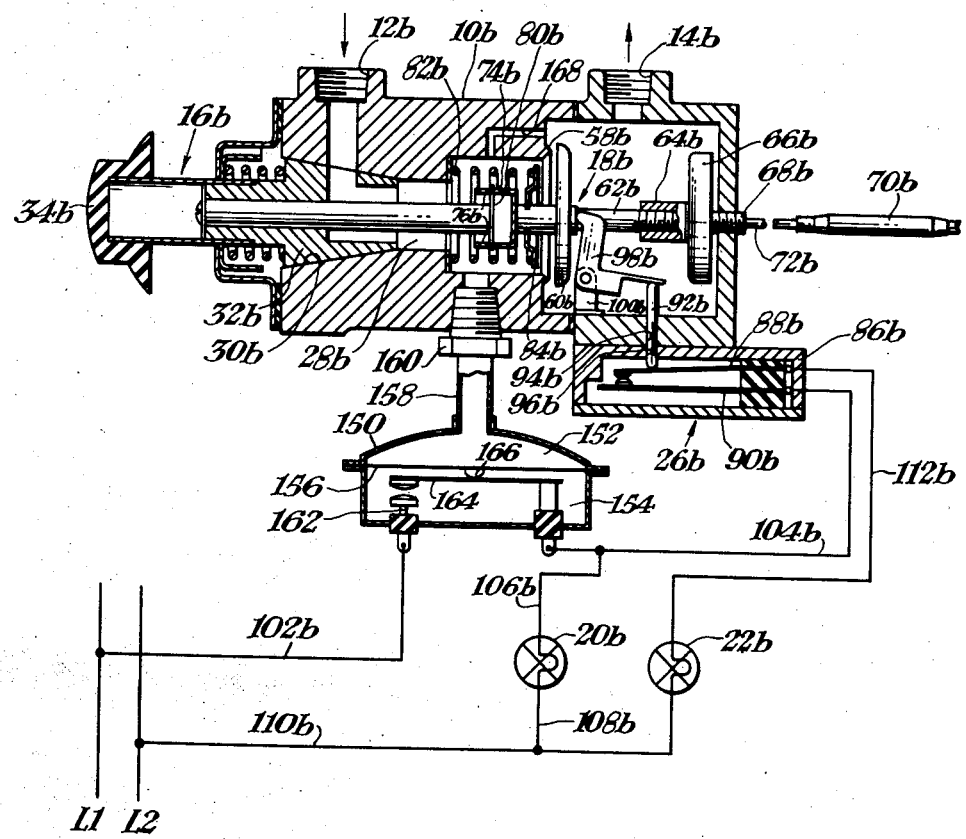
Fig. 3 is a schematic showing of a modified control system embodying this invention.

The modified construction illustrated by Fig. 3, in which parts corresponding to parts heretofore described are designated by corresponding reference numerals having the suffix "b," is a departure from that shown in Fig. 1 in that the switch controlling energization of the lamps 20b and 22b and operatively associated with the manually operable valve means 16b is of a different form and is adapted to be actuated in response to variations in fluid pressure controlled by the manually operable valve.

More particularly, the switch of Fig. 3 comprises a housing 150 with the interior thereof divided into a pair of chambers 152, 154 by a flexible sealing device or diaphragm 156. The housing 150 is mounted on the casing 10b by a suitable nipple 158 and fitting 160, the nipple and fitting defining a passage maintaining communication between the chamber 152 in the housing 150 and the passage 28b in the casing 10b.

A switch comprising a fixed contact 162 and a movable contact 164 is mounted on the housing 150 within the chamber 154 with the contact 162 connected to the wire 102b and the movable contact 164 connected to the wire 104b. The movable contact 164 is normally spaced from the fixed contact 162 and is engageable by a thrust element 166 carried on the diaphragm 156 to be moved into engagement with the contact 162.

Operation of the embodiment shown in Fig. 3 is similar to the operation of the apparatus shown in Fig. 1 but differs in that movement of the manually operable valve means 16b to open position admits fluid under pressure to the chamber 28b and to the chamber 152 causing the diaphragm 156 to be deflected and moving the contact 164 into engagement with the contact 162. Contacts 162, 164 are maintained in engagement with each other as long as the manually operable valve means 16b is in the open position. However, upon movement of the manual valve to closed position, fluid pressure within the chamber 152 is reduced, being bled off through the burner. The diaphragm 156 then returns to the position shown in Fig. 3 and the movable contact 164 is separated from the contact 162.

To insure bleeding of the chamber 152 when the manual valve 16b is moved to closed position regardless of the position of the thermally responsive valve 18b, a bleed or by-pass passage 168 is formed in the casing 10b to communicate with the passage 28b and the outlet 14b.

Although the disclosed embodiments of this invention have been described in considerable detail, it is to be understood that such description is intended as illustrative rather than limiting as the invention may be variously embodied and it is to be interpreted as claimed.

It is claimed and desired to secure by Letters Patent:

1. A control and indicating device comprising a casing having an inlet and an outlet connected by passage means including a valve seat, a valve member movable toward and away from said seat for controlling fluid flow through said casing, said casing having a threaded aperture formed in the wall thereof adjacent said valve member, a housing having an elongated shank formed thereon for threaded engagement with the walls of said aperture and to detachably mount said housing on said casing, said shank having an axial bore formed therein providing communication between the interiors of said casing and said housing, a switch in said housing, an operating element slidably mounted in said bore and operatively engageable with said switch, and lever means in said casing operatively connected to said valve member and operatively connected to said element when said housing is detachably mounted on said casing for actuating said switch in response to movement of said valve member.

2. A control and indicating device as claimed in claim 1 and including flexible sealing means in said housing for dividing the interior thereof into first and second chambers, said first chamber communicating with said bore, said switch being disposed in said second chamber and operatively engaging one side of said flexible sealing means, said element operatively engaging the other side of said flexible sealing means.

3. A control and indicating device comprising a casing having an inlet and an outlet connected by passage means including a valve seat, a valve member movable toward and away from said seat for controlling fluid flow through said casing, said casing having a threaded aperture formed in the wall thereof adjacent said valve member, a pair of juxtaposed cup-shaped members, a diaphragm between said members, means for clamping said cup-shaped members and diaphragm together in fluid sealing relation to define a housing having a pair of chambers therein separated by said diaphragm, an elongated shank formed on the bottom wall of one of said cup-shaped members for threaded engagement with the walls of said aperture and to detachably mount said cup-shaped member on said casing, said shank having an axial bore formed therein providing communication between the interior of said casing and one of said chambers, a switch disposed in the other of said chambers and operatively engaging one side of said diaphragm, an operating element slidably mounted in said bore and operatively engaging the other side of said diaphragm, and lever means in said casing operatively connected to said valve member, said lever means being constructed to be in operative engagement with said operating member when said elongated shank is in threaded engagement with the walls of said aperture for activating said switch in response to movement of said valve member.

References Cited in the file of this patent

UNITED STATES PATENTS

| | | |
|---|---|---|
| 1,177,857 | Gilbert | Apr. 4, 1916 |
| 2,006,882 | Cleveland | July 2, 1935 |
| 2,237,577 | Ray | Apr. 8, 1941 |
| 2,244,373 | Powers | June 3, 1941 |
| 2,361,530 | Burch | Oct. 31, 1944 |
| 2,399,033 | Hudson | Apr. 23, 1946 |
| 2,495,398 | Weber | Jan. 24, 1950 |